United States Patent
Tredoux et al.

(10) Patent No.: US 9,489,347 B2
(45) Date of Patent: Nov. 8, 2016

(54) METHOD AND APPARATUS FOR INCORPORATING ADDITIONAL CONTENT IN A PRINTED DOCUMENT AT A TIME OF PRINTING

(71) Applicant: Xerox Corporation, Norwalk, CT (US)

(72) Inventors: Gavan Leonard Tredoux, Penfield, NY (US); Shanmuga-Nathan Gnanasambandam, Victor, NY (US); Premkumar Rajendran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 14/275,345

(22) Filed: May 12, 2014

(65) Prior Publication Data

US 2015/0324331 A1  Nov. 12, 2015

(51) Int. Cl.
*G06F 17/00* (2006.01)
*G06F 17/21* (2006.01)

(52) U.S. Cl.
CPC ............. *G06F 17/21* (2013.01); *G06F 17/212* (2013.01)

(58) Field of Classification Search
CPC .............................. G06F 3/1292; G06F 3/1293
See application file for complete search history.

(56) References Cited

U.S. PATENT DOCUMENTS

| | | | | |
|---|---|---|---|---|
| 7,370,090 B2* | 5/2008 | Nakaoka | ............... | G06F 3/1204 358/1.15 |
| 7,386,791 B2* | 6/2008 | Jacobson | ............. | G06F 17/248 358/1.12 |
| 9,063,689 B2* | 6/2015 | Suzuki | ................. | G06F 3/1296 |
| 2013/0024326 A1* | 1/2013 | Dearing | ............... | G06Q 30/02 705/26.61 |
| 2015/0092233 A1* | 4/2015 | Park | ..................... | G06F 3/1288 358/1.15 |

* cited by examiner

*Primary Examiner* — Amelia Tapp

(57) ABSTRACT

A method, non-transitory computer readable medium, and apparatus for incorporating additional content in a document at a time of processing are disclosed. For example, the method initiates a request to process a document, receives an option to include one or more additional content to the document, selects at least one additional content to add to the printed document from the endpoint device at the time of processing, defines at least one access control of the at least one additional content and sends the request to process the document, wherein the at least one additional content is incorporated into the document that is processed and the at least one additional content has the at least one access control.

6 Claims, 3 Drawing Sheets

METHOD AND APPARATUS FOR INCORPORATING ADDITIONAL CONTENT IN A PRINTED DOCUMENT AT A TIME OF PRINTING

The present disclosure relates generally to incorporating content in a printed document and, more particularly, to a method and apparatus for incorporating additional content in a printed document at a time of printing.

BACKGROUND

Some users may find it convenient to incorporate additional content into printed documents. Readers of the printed documents can then access the additional content and augment the information presented in the document itself. For example, user may want to add various types of external content in an electronic form to the printed document.

Previous attempts to allow users to add additional content into printed documents have been hard to use. In particular, it has been hard to create augmented documents that include additional content in a printed document. Readers may also have trouble reading the printed document or accessing the additional content. The previous attempts may also restrict when and how the additional content is added to the printed documents.

In addition, it has been difficult to impose more fine-grained control over access to the additional content into the printed documents. In other words, previous methods may provide no security at all to the additional content or be restrictive on what kind of security is used or how much security is used to control access to the additional content.

SUMMARY

According to aspects illustrated herein, there are provided a method, a non-transitory computer readable medium, and an apparatus for incorporating additional content in a document at a time of processing. One disclosed feature of the embodiments is a method that initiates a request to process a document, receives an option to include one or more additional content to the document, selects at least one additional content to add to the printed document from the endpoint device at the time of processing, defines at least one access control of the at least one additional content and sends the request to process the document, wherein the at least one additional content is incorporated into the document that is processed and the at least one additional content has the at least one access control.

Another disclosed feature of the embodiments is a non-transitory computer-readable medium having stored thereon a plurality of instructions, the plurality of instructions including instructions which, when executed by a processor, cause the processor to perform an operation that initiates a request to process a document, receives an option to include one or more additional content to the document, selects at least one additional content to add to the printed document from the endpoint device at the time of processing, defines at least one access control of the at least one additional content and sends the request to process the document, wherein the at least one additional content is incorporated into the document that is processed and the at least one additional content has the at least one access control.

Another disclosed feature of the embodiments is an apparatus comprising a processor and a computer readable medium storing a plurality of instructions which, when executed by the processor, cause the processor to perform an operation that initiates a request to process a document, receives an option to include one or more additional content to the document, selects at least one additional content to add to the printed document from the endpoint device at the time of processing, defines at least one access control of the at least one additional content and sends the request to process the document, wherein the at least one additional content is incorporated into the document that is processed and the at least one additional content has the at least one access control.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for incorporating additional content in a printed document at a time of printing. As discussed above, some users may want to incorporate additional content into a printed document that can be accessed from a link to an external source for the additional content. Previous attempts required the user to incorporate the additional content into the document before sending the document for printing. In addition, previous attempts did not provide fine grained access control over the additional content.

One embodiment of the present disclosure addresses this problem by providing a method to allow users to incorporate additional content into a document at a time of printing. In other words, the user does not need to create the document to include the additional content first before sending a request to print the document. Said another way, the document may be modified to include references or marks that direct a reader's endpoint device to a location to retrieve the additional content "on-the-fly" at a time of printing a document that previously did not have any additional content incorporated into the document.

In addition, one embodiment of the present disclosure provides fine-grained access control over the document. For example, the access control may be based on a time control, a location control, a passcode control, a payment control, a multiple reader control, and the like. As a result, a user may easily incorporate additional content (e.g., digital content such as a picture, a video, a website, and the like) into a document at a time of printing by including a mark that another endpoint device can read off of the printed document to be directed to the additional content.

Figure 1:
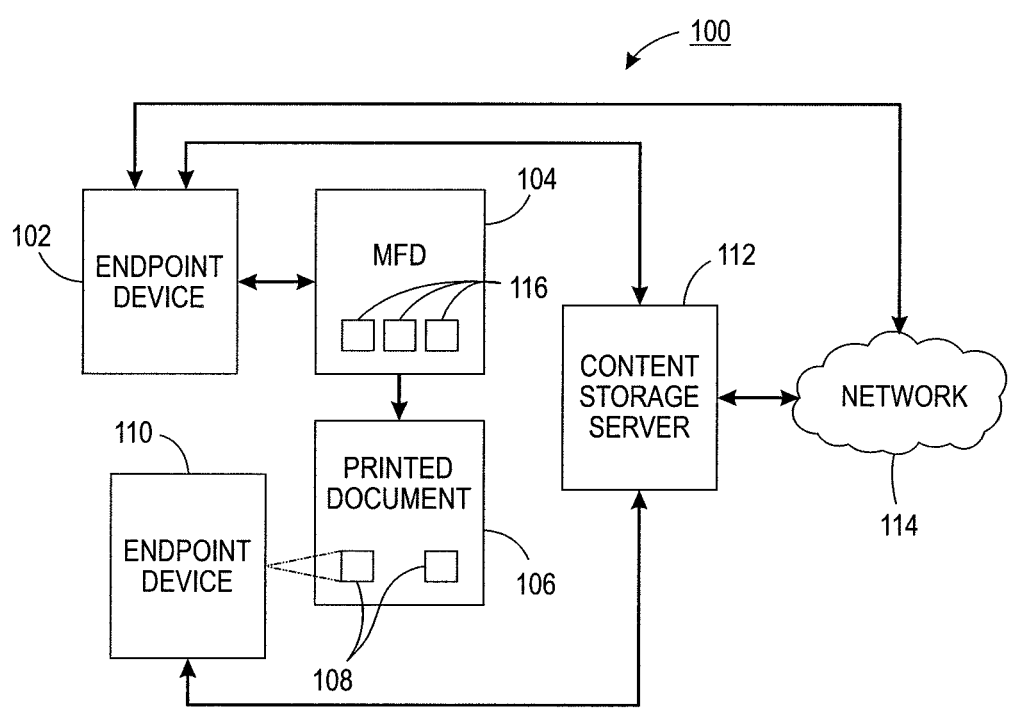
FIG. 1 illustrates an example block diagram of a system of the present disclosure.

FIG. 1 illustrates an example system 100 of the present disclosure. In one embodiment, the system 100 may include one or more endpoint devices 102 and 110, a multi-function device (MFD) 104 and a content storage server 112. In one embodiment, the one or more endpoint device 102 and 110 may be a mobile endpoint device, such as for example, a smart phone, a cellular telephone, a tablet computer, a laptop computer, and the like. The one or more endpoint devices 102 and 110 may be equipped with any type of short range communications protocol or personal area network (PAN) communications protocols, such as for example, near field communications (NFC) technology, Bluetooth®, Zigbee®, and the like. The one or more endpoint devices 102 and 110 may also be equipped with a camera with bar code or quick response (QR) code reading technologies.

In one embodiment, the MFD 104 may be any type of device that is capable of printing or scanning a document. For example, the MFD 104 may be a fax/copy/scan and print machine, a stand-alone printer, a laser printer, an ink-jet printer, and the like. The MFD 104 may include a processor and a memory to perform the functions described herein. The MFD 104 may also include a user interface (e.g., a graphical user interface (GUI) with a touch screen or a key pad). In one embodiment, the MFD 104 may have a wired or wireless connection to communicate with the one or more endpoint devices 102 and 110.

In one embodiment, the content storage server 112 may be deployed as a general application server or a general purpose computer, as described below and illustrated in FIG. 3. In one embodiment, the content storage server 112 may include a processor and memory to temporarily store content (e.g., digital content) selected by the endpoint device 102, as discussed below. In one embodiment, the content storage server 112 may obtain content directly from the endpoint device 102 or retrieve content from the Internet 114.

The content storage server 112 may be located remotely from the endpoint devices 102 and 110 and the MFD 104. For example, the content storage server 112 may be located within a network of a third party service provider providing the services described herein. The content storage server 112 may communicate with the endpoint devices 102 and 110 via a wired or wireless connection.

Although FIG. 1 illustrates two endpoint devices 102 and 110, a single MFD 104 and a single content storage server 112, it should be noted that any number of endpoint devices, MFDs and content storage servers may be deployed. It should also be noted that FIG. 1 has been simplified for ease of explanation. For example, the system 100 may include one or more additional access networks, network elements, and the like, between the endpoint devices 102 and 110 and the content storage server 112 and also between the content storage server 112 and the Internet 114.

In another embodiment, the MFD 104 may be enabled with "tap to print" and/or "tap to scan" services. For example, the MFD 104 may have one or more NFC tags 116 that include identifiers, such as a network address, to allow the endpoint device 102 to send a print request to the MFD 104. For example, the endpoint device 102 may simply go up to the MFD 104 and read an NFC tag 116 and a print menu may appear on a display of the endpoint device 102.

The examples discussed below are related to printing a document. However, it should be noted that the embodiments may be equally applied to scanning of a document. In one embodiment, the print menu may include an option to incorporate additional content into a printed document 106 at a time of printing. The additional content may be incorporated into the printed document 106 via one or more marks 108. The marks 108 may be a bar code, a QR code, a glyph, and the like. In one embodiment, the marks 108 may be hidden within the text so the marks 108 are not easily visible to, interfere with or distract a person reading the printed document 106.

As discussed above, previously a user would be required to create a document that included additional content before the user would send a request to print. In contrast, one embodiment of the present disclosure allows a user to incorporate additional content into the printed document at a time of printing. In other words, the additional content may be incorporated "on-the-fly". Said another way, the user is not required to modify the document in any way before sending the request to print the document.

In one embodiment, when the endpoint device 102 reads the NFC tag 116 to send a request to print a document, the user may want to include external content (e.g., a video) that may be related to the text in the document. When the print menu appears on the endpoint device 102, the user may be provided an option to include the additional content. The user may include one or more additional content. The additional content may be any external content such as, for example, digital content (e.g., videos, pictures, movies, electronic documents, electronic files, graphics, and the like), a link to the content (e.g., a URL), and the like. The external content may be stored on the endpoint device 102 and incorporated into the document to be printed on the fly at the time of printing.

In one embodiment, if the additional content is on the endpoint device 102, then the additional content may be transmitted to the content storage server 112. In another embodiment, the endpoint device may have a universal resource locator (URL) link to the additional content. The URL link may be sent to the content storage server 112 and the content storage server 112 may retrieve the content from the Internet 114 for temporary storage. In another embodiment, the additional content may be stored in an NFC tag (e.g., the one or more NFC tags 116), directly or by reference, in whole or in part. The NFC tag may be sent to the content storage server 112 and the content storage server 112 may read the NFC tag to obtain the additional content or retrieve the content if the additional content is referenced by the NFC tag at another location.

In one embodiment, the different NFC tags 116 may also include different additional content that may be included at a time of printing. For example, in embodiments where the additional content is stored wholly on the NFC tags 116 or by reference on the NFC tags 116, multiple different tags 116 may be offered to allow a choice of what additional content to include from the NFC tags 116.

In one embodiment, the additional content may be automatically selected based on one or more sensor readings of the endpoint device 102. For example, the location of the endpoint device 102 may be detected via global positioning system (GPS) coordinates of the GPS sensor in the endpoint device 102, via a triangulation of cell towers, via a name of a wireless fidelity (Wi-Fi) network, and the like. Based on the location of the endpoint device 102 and an expected group of people within a predefined radius of the location of the endpoint device 102, additional content may be automatically selected from the endpoint device 102. For example, a user may be within 10 miles of his or her home and the endpoint device 102 may automatically select a family photograph to be included in the printed document 106. Other sensor readings that may be included may be, for example, an altimeter, a thermometer, and the like.

In one embodiment, multiple sensor readings may be combined to automatically select additional content from the endpoint device 102. For example, based on a high temperature on a hot summer day, the endpoint device 102 may automatically select links to websites of ice cream parlors within a one mile radius of the GPS coordinates of the endpoint device 102 to be included in the printed document 106.

In one embodiment, the additional content may be associated with the printed document 106 via a unique identifier. For example, when the endpoint device 102 sends a request to print the printed document 106, the printed document 106 may be assigned a unique identifier (e.g., a numerical sequence or an alphanumeric sequence). The additional content selected by the user may also be assigned the unique identifier that was assigned to the printed document 106. Thus, the endpoint device 102 may send the additional content with the unique identifier. In one embodiment, the content storage server 112 may store a database of all the additional content with a respective unique identifier such that the correct additional content may be retrieved for the correct printed document.

In one embodiment, new additional content that is subsequently added to the printed document 106 may also be assigned the unique identifier of previously added additional content. As a result, a feedback loop to the original document may be generated, thereby creating a thread. In other words, when another user decides to attach more additional content to the printed document 106, the additional content may be added to the "thread" of previously added additional content using the unique identifier.

In one embodiment, the "thread" of additional content may provide a print option for the printed document 106. For example, a user may decide to print the whole "thread" of additional content, only a last node of the additional content or a filtered or specific part of the additional content "thread". For example, the "thread" of additional content may be filtered by a date, content added by a particular person or user, a range, and the like.

In one embodiment, the "thread" of additional content may provide a process option for the printed document 106. For example, a user may decide to apply optical character recognition (OCR) or archive the whole "thread" of additional content, only a last node of the additional content or a filtered or specific part of the additional content "thread". For example, the "thread" of additional content may be filtered by a date, content added by a particular person or user, a range, and the like.

Concurrently, the MFD 104 may print the document to produce the printed document 106 including a mark 108 that references the additional content selected by the user of the endpoint device 102. The mark 108 may include information that directs another endpoint device 110 to the external content related to the printed document 106. For example, the mark 108 may be read by the endpoint device 110 of a reader who receives the printed document 106. The endpoint device 110 may then be directed, via the information in the mark 108 (e.g., an address of the content storage server 112 and the unique identifier of the printed document and additional content) to the content storage server 112 to retrieve the additional content.

In one embodiment, the content storage server 112 may send the appropriate additional content to the endpoint device 110. The correct additional content may be identified by matching the unique identifier received from the endpoint device 110 with the unique identifier of one or more of the additional content stored at the content storage server 112. As a result, by temporarily storing the additional content at the content storage server 112, the additional content may be more efficiently and quickly retrieved and forwarded to the endpoint device 110 requesting the content.

In addition, by storing the additional content in the content storage server 112 more access control may be provided to the user that includes the additional content (e.g., the user of the endpoint device 102). Another benefit of tracking the access controls at the content storage 112 is that all users are not required to pre-enroll with the system. In one embodiment, the user of the endpoint device 102 may include at least one access control to the additional content that is to be included in the document.

In one embodiment, the access control may be based on a pre-defined user policy stored on the endpoint device 102. For example, the user may define what type of access control should be selected based on a type of additional content that is selected. In another embodiment, the user may define what type of access control should be selected based on a security sensitivity associated with a document. The access control may be automatically selected and applied to the additional content based on the pre-defined user policy.

In another embodiment, the access control may be based on a user's previous selections or tendencies. For example, the endpoint device 102 may detect that a particular access control has been selected the last five times. The endpoint device 102 may automatically apply the same access control to additional content that is selected in a subsequent print request or provide a prompt to the user asking whether the user would like to use the same access control.

In another embodiment, the MFD 104 may include a plurality of different NFC tags 116. Each tag may be coded differently (e.g., a different number, a different color, and the like) that indicates a different access control. The user may select the appropriate access control by using the endpoint device 102 to read the NFC tag 116 associated with a desired access control.

Thus, when the appropriate access control is selected for the additional content that is incorporated into the printed document 106, the endpoint device 102 may also send the selected access control to the content storage server 112. The content storage server 112 may track a respective access control for each one of the additional content that is stored at the content storage server in a database. As a result, when the endpoint device 110 requests access to the additional content in the printed document 106, the content storage server 112 may also require the endpoint device 110 to meet the requirements or parameters of the access control that is associated with the requested additional content.

In one embodiment, the access control may include a time control, a location control, a passcode control, a payment control, a multiple reader control, and the like. The time control may include a time lapse or counted limitations. For example, the user may define an amount of time or a period of time that the additional content is available for. After the time period expires, access may be denied to the additional content. The counted limitations may allow the user to define a number of times the additional content can be viewed. After the additional document has been accessed past the defined number of times, access may be denied.

The location control may include GPS coordinates or environmental conditions (e.g., temperature, altitude, magnetic compass reading, Wi-Fi access points, and the like). For example, the user may define a radius within a GPS coordinate that the additional content may be accessed. In another embodiment, the user may define restrictions on a radius within a GPS coordinate that the additional content may not be accessed. The GPS coordinates may require the endpoint device of the reader to enable GPS capabilities on his or her endpoint device to comply with GPS coordinate access control.

In one embodiment, the environmental conditions access control may allow the user to define various environmental conditions of a location that are required to access the additional content. For example, the location may need to be within a temperature range, an altitude range, within range of a particular WiFi access point and the like. The user may define two or more of the environmental conditions be met for additional control (e.g., a temperature range and an altitude range or a temperature range within a GPS coordinate radius).

In one embodiment, the passcode control may allow the user to set a passcode to control access to the additional content. For example, the user may provide a passcode to the content storage server 112 and the endpoint device 110 to access the additional content. In one embodiment, the passcode may include a password comprised of alphanumeric text.

In another embodiment, the passcode may include a biometric reading. For example, the biometric reading may be a photograph of the individuals that are allowed to access the additional content, a voice recording of the individuals that are allowed to access the additional content, a fingerprint reading of the individuals that are allowed to access the additional content, and the like.

In one embodiment, the payment control may allow the user to require a payment or a license to software required to read the mark 108 on the printed document. For example, the user's of the endpoint device 110 that read the printed document 106 may be required to pay (e.g., a one-time payment) to access the additional content. In another embodiment, the reader may be required to buy software or an application that is run on the endpoint device 110 that is capable of reading a proprietary mark 108 on the printed document 106 to access the additional content.

In one embodiment, the multiple reader control may allow the user to control access by requiring multiple readers be present to access the additional content. For example, the user may require at least two readers that obtained the printed document 106 request access to the additional content at the same time or approximately the same time (e.g., within 30 seconds of each other). For example, the content storage server 112 may require that the request come from two different internet protocol (IP) addresses or two different media access control (MAC) to ensure a single person is not trying to send the same request two different times.

The multiple reader control may also allow the user to define how many readers can simultaneously access the additional content. For example, the user may limit access to the additional content to no more than 5 individuals at the same time.

It should be noted that the above examples of access control should not be considered limiting. For example, other types of access control that allow the user to have fine grain control (e.g., who has access, how many people have access, when access is allowed, where access is allowed, and the like) of the access to the additional documents may be applied to the additional content and are within the scope of the present disclosure.

Figure 2:
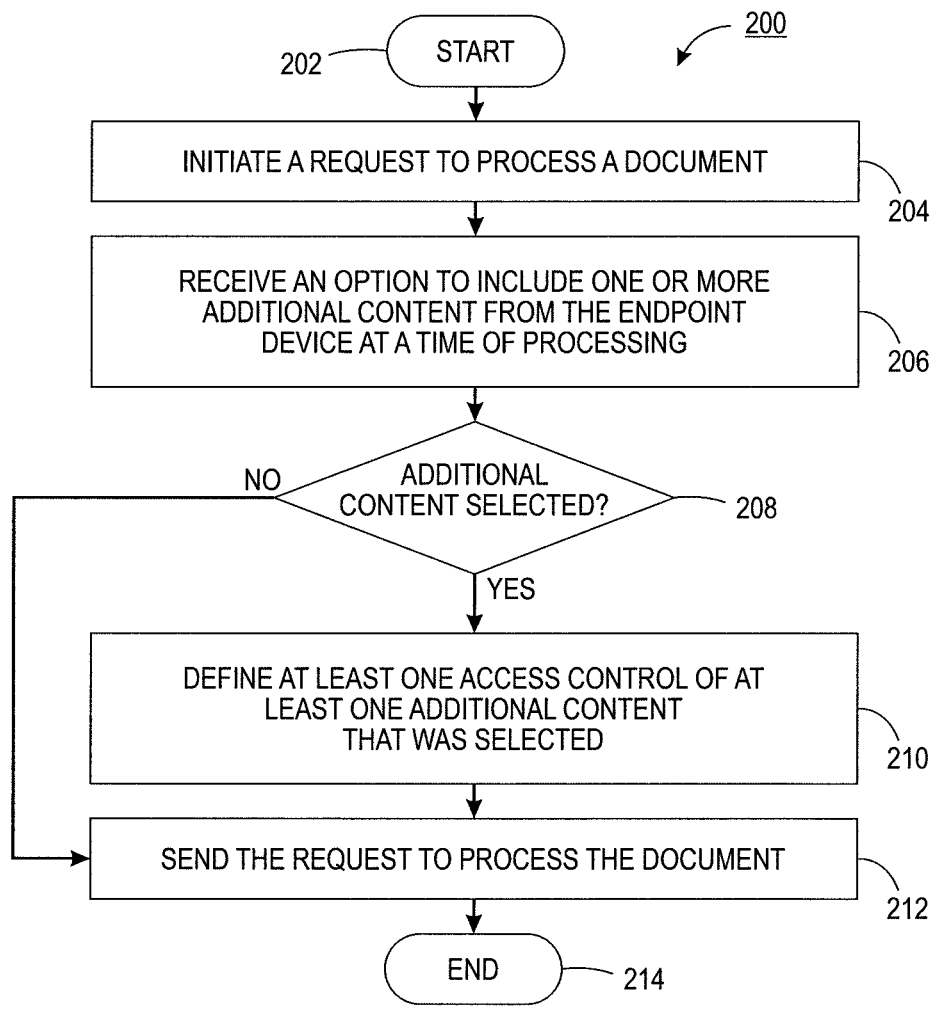
FIG. 2 illustrates an example flowchart of one embodiment of a method for incorporating additional content in a document at a time of processing.

FIG. 2 illustrates a flowchart of a method 200 for incorporating additional content in a document at a time of processing. In one embodiment, one or more steps or operations of the method 200 may be performed by the endpoint device 102 or a general-purpose computer as illustrated in FIG. 3 and discussed below.

At step 202 the method 200 begins. At step 204, the method 200 initiates a request to process a document. For example, a user may walk up to an MFD and use a "tap to print" or "tap to scan" functionality of the MFD to initiate the request to print or scan the document via his or her endpoint device, e.g., a mobile endpoint device. For example, the endpoint device may read an NFC tag on the MFD to initiate the print request. In one embodiment, when the request to print or scan the document is initiated, a unique identifier may be assigned to the document.

At step 206, the method 200 receives an option to include one or more additional content from the endpoint device at a time of processing. For example, when the endpoint device reads an NFC tag on the MFD, the display on the endpoint device may provide a print menu or a scan menu that includes an option to include one or more additional content in the document (e.g., either a printed document or a scanned document).

In one embodiment, the additional content may be any type of digital content or link to the additional content that is stored external to the document. In one embodiment, the additional content may be stored temporarily in a content storage server.

The different types of digital content may include, for example, videos, pictures, movies, electronic documents, electronic files, graphics, and the like that are stored in the endpoint device that is used to initiate the request to print the document.

In one embodiment, the additional content may be automatically selected based on one or more sensor readings of the endpoint device. For example, the location of the endpoint device may be detected via GPS coordinates of the GPS sensor in the endpoint device 102, via a triangulation of cell towers, via a name of a Wi-Fi network, and the like. Based on the location of the endpoint device and an expected group of people within a predefined radius of the location of the endpoint device, additional content may be automatically selected from the endpoint device. For example, a user may be within 10 miles of his or her home and the endpoint device may automatically select a family photograph to be included in the document. Other sensor readings that may be included may be, for example, an altimeter, a thermometer, and the like.

In one embodiment, multiple sensor readings may be combined to automatically select additional content from the endpoint device. For example, based on a high temperature on a hot summer day, the endpoint device may automatically select links to websites of ice cream parlors within a one mile radius of the GPS coordinates of the endpoint device to be included in the document.

At step 208, the method 200 determines if additional content was selected. If no additional content was selected, the method 200 proceeds to step 212. In other words, the document is printed by the MFD without including any marks that reference additional content that is external to the document.

However, if additional content was selected at step 210, the unique identifier that was assigned to the document to be printed may also be assigned to the additional content that is selected. The unique identifier may also include a secondary identifier to identify different additional content within a single document if two or more additional contents are selected. For example, if the unique identifier for the document is 12345 and the user selects two additional contents, then the unique identifier for the additional content may be 12345A and 12345B, respectively. The unique identifier may be the same (e.g., 12345), but the additional content may include the second identifier (e.g., A for the first additional content and B for the second additional content). The content storage server may use the unique identifiers to link the correct additional content to a particular printed document.

The method 200 may then proceed to step 210. At step 210, the method 200 defines at least one access control of the at least one additional content that was selected. In one embodiment, the access control may be based on a pre-defined user policy, based on a user's previous selections or tendencies or based on one of a plurality of different NFC tags each representing a different access control on the MFD. In one embodiment, the different types of access controls may include at least one of a time control, a location control, a passcode control, a payment control or a multiple reader control, as described above.

In one embodiment, if the user selects two or more additional contents, the user may select a different access control for each one of the additional contents. For example, a first one of the additional contents may have a time control and a second one of the additional contents may have a location control.

In one embodiment, the content storage server may keep track of the appropriate access control for each additional document that is stored in the content storage server. Thus, when a request is received for additional content, the content storage server may require the appropriate evidence to satisfy the requirements of the selected access control.

At step 212, the method 200 sends the request to process the document. For example, the document may be sent outbound to the MFD to be printed or may be scanned by the MFD and received inbound from the MFD at which time the endpoint device may "send" the request to an appropriate module within the endpoint device to process the document. In one embodiment, if the method 200 arrives at step 212 directly from step 208, the document contains no additional content and the document is printed with no marks.

However, if the method 200 arrives at step 212 from step 210, then additional content was selected and the additional content may be incorporated into the document that is printed and the at least one additional content also has the at least one access control. As described above, the additional content may be incorporated into the printed document using a mark. In one embodiment, the marks may be a bar code, a QR code, a glyph, and the like. In one embodiment, the marks may be hidden within the text such that they are not easily visible to a person reading the printed document. The marks may include information associated with the additional content such that the reader may retrieve the additional content from the content storage server (e.g., an address of the content storage server, the unique identifier, the required access control, and the like). At step 214, the method 200 ends.

Thus, embodiments of the present disclosure provide a method to allow a user to incorporate additional content into a document to be printed at a time of printing. In other words, the user does not need to incorporate the additional content into the document before sending the print request. Rather, the additional content can be added "on-the-fly" by the MFD. In addition, the embodiments of the present disclosure allow the user to have fine grain control of access to the additional contents that were previously not available.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

Figure 3:
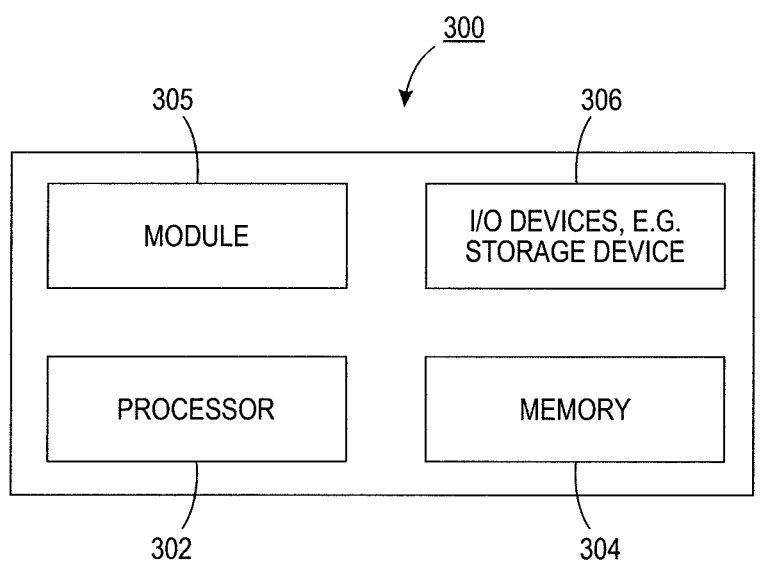
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for incorporating additional content in a printed document at a time of printing, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for incorporating additional content in a printed document at a time of printing (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s)

can be perceived as a programmed processor or a specialized processor. As such, the present module 305 for incorporating additional content in a printed document at a time of printing (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for incorporating additional content in a document at a time of printing, comprising:
    initiating, by a processor of an endpoint device, a request to print the document by reading a near field communication (NFC) tag on a multi-function device (MFD), wherein the initiating causes a unique identifier to be assigned to the document;
    receiving, by the processor, an option to include one or more additional content to the document at a time the request is made on the endpoint device;
    selecting, by the processor, at least one digital content from the endpoint device to add to the document, wherein the selecting is based on a sensor reading of the endpoint device, wherein the selecting causes the unique identifier to be assigned to the at least one digital content such that the at least one digital content is linked to the document;
    defining, by the processor, at least one access control of the at least one digital content;
    sending, by the processor, the request to print the document, wherein the at least one digital content is incorporated into the document that is printed as a mark that directs a reading endpoint device to an external link to view the at least one digital content and the at least one digital content has the at least one access control;
    initiating, by the processor, a second request to print the document;
    receiving, by the processor, the option to include a second one or more additional content to the document;
    selecting, by the processor, at least one second additional content to add to the document, wherein the at least one second additional content is assigned the unique identifier also assigned to the at least one additional content to form a thread including the at least one additional content and the at least one second additional content;
    sending, by the processor, the second request to print the document; and
    receiving, by the processor, a filtered selection of a subset of additional content within the thread for processing.

2. The method of claim 1, wherein the at least one access control comprises at least one of: a time control, a location control, a passcode control, a payment control, or a multiple reader control.

3. The method of claim 1, wherein the defining comprises at least one of: reading one of a plurality of different tags on a multi-function device used to initiate the request to process, wherein each one of the plurality of different tags represents a different access control, using a previously used access control, or using a user-profile that defines an access control to use for each different type of additional content.

4. A non-transitory computer-readable medium storing a plurality of instructions which, when executed by a processor of an endpoint device, cause the processor to perform operations for incorporating additional content in a document at a time of printing, the operations comprising:
    initiating a request to print the document by reading a near field communication (NFC) tag on a multi-function device (MFD), wherein the initiating causes a unique identifier to be assigned to the document;
    receiving an option to include one or more additional content to the document at a time the request is made on the endpoint device;
    selecting at least one digital content from the endpoint device to add to the document, wherein the selecting is based on a sensor reading of the endpoint device, wherein the selecting causes the unique identifier to be assigned to the at least one digital content such that the at least one digital content is linked to the document;
    defining at least one access control of the at least one digital content;
    sending the request to print the document, wherein the at least one digital content is incorporated into the document that is printed as a mark that directs a reading endpoint device to an external link to view the at least one digital content and the at least one digital content has the at least one access control;
    initiating a second request to print the document;
    receiving the option to include a second one or more additional content to the document;
    selecting at least one second additional content to add to the document, wherein the at least one second additional content is assigned the unique identifier also assigned to the at least one additional content to form a thread including the at least one additional content and the at least one second additional content;
    sending the second request to print the document; and
    receiving a filtered selection of a subset of additional content within the thread for processing.

5. The non-transitory computer readable medium of claim 4, wherein the at least one access control comprises at least one of: a time control, a location control, a passcode control, a payment control, or a multiple reader control.

6. The non-transitory computer readable medium of claim 4, wherein the defining comprises at least one of: reading one of a plurality of different tags on a multi-function device used to initiate the request to process, wherein each one of the plurality of different tags represents a different access control, using a previously used access control, or using a user-profile that defines an access control to use for each different type of additional content.

* * * * *